United States Patent
Wolff

(10) Patent No.: US 6,692,087 B1
(45) Date of Patent: Feb. 17, 2004

(54) CONTROL UNIT FOR A WHEEL BRAKE OF A MOTOR VEHICLE

(75) Inventor: Guenter Wolff, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 10/111,338

(22) PCT Filed: Sep. 14, 2000

(86) PCT No.: PCT/DE00/03199
§ 371 (c)(1),
(2), (4) Date: Jul. 29, 2002

(87) PCT Pub. No.: WO01/28832
PCT Pub. Date: Apr. 26, 2001

(51) Int. Cl.[7] .............................. B60T 13/74; B60T 8/32; B60T 8/48; F16D 65/16
(52) U.S. Cl. ...................... 303/10; 188/358; 188/72.1; 303/DIG. 3; 303/3; 303/15; 303/116.1; 303/DIG. 4; 303/155; 303/113.4
(58) Field of Search ..................... 303/10, 155, DIG. 3, 303/DIG. 4, 166, 11–12, 3, 15, 116.1–116.4, 113.4, 114.1, 115.1–115.6, 68; 188/358, 359, 72.4, 72.1, 162; 701/70; 60/545, 547.1

(56) References Cited

U.S. PATENT DOCUMENTS 4,435,021 A * 3/1984 Hoenick ...................... 303/10
4,610,485 A   9/1986 Watanabe
6,170,921 B1 * 1/2001 Rohr et al. .................... 303/3
6,328,388 B1 * 12/2001 Mohr et al. .............. 303/116.4

FOREIGN PATENT DOCUMENTS

| DE | 195 27 936 | 1/1997 |
| FR | 2 598 763 | 11/1987 |

* cited by examiner

Primary Examiner—Douglas C. Butler

(57) ABSTRACT

An actuating unit for a wheel brake of a motor vehicle has a hydraulic pump drivable with variable speed by an electric motor, as well as an element, adjusting the return flow of pressurized media to the pump, which is arranged between the delivery side and the intake side of the pump. Furthermore, a cylinder-piston unit is provided, having a piston with identical surfaces on both sides, as well as a cylinder having cylinder chambers arranged on both sides of the piston. In order to press a brake lining against a friction element connected to a vehicle wheel, the pump is connected on the intake side to the cylinder chamber on the brake-lining side, and on the delivery side to the cylinder chamber facing away from the brake lining. The actuating unit is assigned a control device by which an electric brake request signal is able to be processed, and the electric motor and the element are controllable.

4 Claims, 1 Drawing Sheet

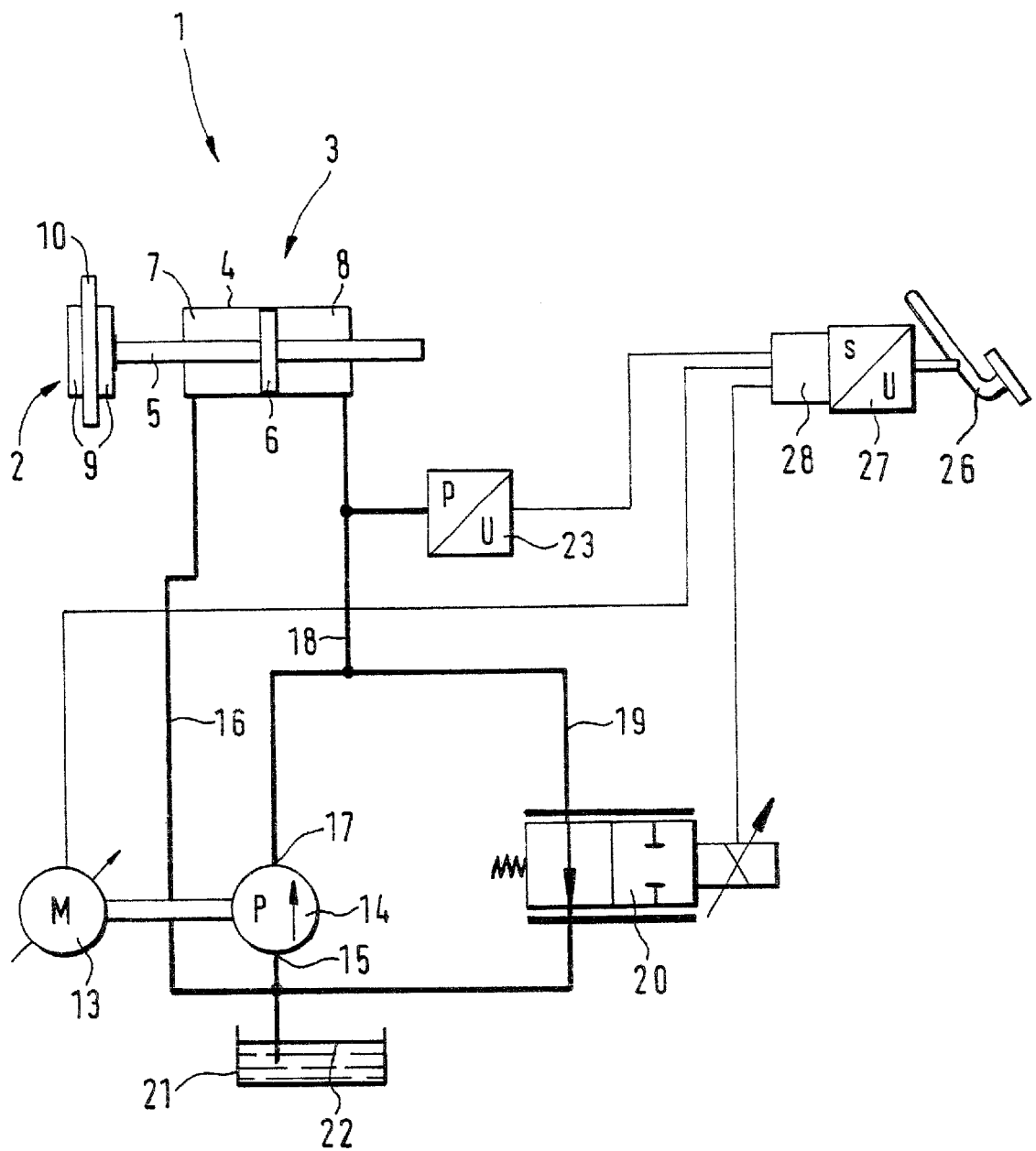

CONTROL UNIT FOR A WHEEL BRAKE OF A MOTOR VEHICLE

FIELD OF THE INVENTION

The present invention relates to an actuating unit.

BACKGROUND INFORMATION

An actuating unit for a wheel brake of a motor vehicle is described in German Published Patent Application No. 195 27 936, where a variable-speed electric motor drives a gear wheel pump, which draws in pressurized media from a reservoir and delivers it to a cylinder-piston unit whose pistons are able to press a brake lining against a friction element connected to a vehicle wheel. Provided on the delivery side of the pump is a throttle which is used to control a connection to the reservoir. The pump drive and the throttle are controlled by an electronic brake control to effect pressure build-up, pressure maintenance and pressure reduction in the cylinder-piston unit.

The known actuating unit is disadvantageous insofar as a pressurized-media-conducting connection to the reservoir is present whenever the brakes are actuated. Thus, the actuating unit is not a closed hydraulic system, which is a significant safety shortcoming. Moreover, relatively large dimensions are required for the reservoir in order to provide adequate pressurized media-volume given a seriously worn brake lining.

SUMMARY OF THE INVENTION

In contrast, the actuating unit according to the present invention has the advantage of an increased operational reliability due to the fact that it is a closed hydraulic system. When a braking action occurs, the same pressurized-media volumes are constantly exchanged between the cylinder chamber of the cylinder-piston unit on the brake-lining side and the cylinder chamber facing away from the brake lining. In this manner, the changed piston position is compensated for even when the brake linings are worn. If the hydraulic system is completely sealed, it will not be necessary to replenish the pressurized media. This simplifies servicing the actuating unit, of which a passenger car, for instance, has four. In addition, the actuating unit may be installed in the vehicle already filled with pressurized media.

BRIEF DESCRIPTION OF THE DRAWING

The FIGURE shows a circuit diagram of an actuating unit for a wheel brake of a motor vehicle.

DETAILED DESCRIPTION

A vehicle, not shown in the drawing, has an actuating unit 1 for a wheel brake 2 at each of its wheels. Actuating unit 1, represented in the form of a circuit diagram, has a cylinder-piston unit 3 whose cylinder 4 is penetrated in its entire length by a piston rod 5. A piston 6 mounted thereon is provided with identical surfaces on both sides. In cylinder 4, piston 6 separates two cylinder chambers 7 and 8 from one another, which are filled with hydraulic pressurized media. Piston rod 5 of cylinder-piston unit 3 acts on at least one brake lining 9, which is able to be pressed against a friction element 10 connected to a vehicle wheel—in the case of a disk brake, a brake disk—and lifted off friction element 10.

A hydraulic pump 14, which may be driven at variable speeds by an electric motor 13, constitutes part of actuating unit 1. On its intake side 15, the pump is connected by an intake line 16 in a pressurized-media conductive manner to cylinder chamber 7 on the brake lining side, and on its pressure side 17 by a pressure line 18 to cylinder chamber 8 of cylinder-piston unit 3 facing away from the brake lining. Furthermore, a return line 19 is provided, which connects pressure line 18 to intake line 16 and in which a 2/2 directional control valve is located, which assumes its passthrough position by spring activation and may be brought into its blocking position or any other intermediate position by electromagnetic means. In addition, intake side 15 of pump 14 is coupled to a pressurized-media make-up tank 21 having a small volume, which is sealed off against atmospheric influences by an air- and moisture-proof membrane 22. Lastly, a measuring transformer 23, hereinafter called a pressure sensor, measuring the pressure in cylinder chamber 8 facing away from the brake lining, is connected to pressure line 18.

Actuating unit 1 as well as the additional actuating units assigned to the further vehicle wheels are controllable by the vehicle driver via a brake pedal 26, whose pedal travel is detectable via a measuring transducer 27, hereinafter called a travel sensor. Furthermore, an electronic control device 28 is provided, via which the signal representing an electric brake request signal of travel sensor 27 is able to be processed. Control device 28 is able to control electric motor 13 and directional control valve 20 of all actuating units 1 of the vehicle. In addition, the signals measured by pressure sensors 23 of actuating units 1 are able to be processed in control device 28. Finally, slip-sensitive signals, which are detected at the vehicle wheels by wheel-speed sensors (not shown) are able to be processed in control device 28 for the purpose of slip control, for instance, for an anti-lock protection control, drive slippage protection control, or for directional stability control of the vehicle.

Actuating unit 1 functions as follows:

With the generation of a brake request signal, be it by actuating the brake pedal or by the wheel slippage control of the vehicle, not further described, control device 28 activates electric motor 13 of pump 14, and directional control valve 20 is switched to its blocking position. Pump 14 draws in pressurized media from cylinder chamber 7 located on the brake-lining side, and delivers it to cylinder chamber 8 of cylinder-piston unit 3 facing away from the brake lining. In the drawing, piston 6 with piston rod 5 is shifted to the left, and the at least one brake lining 9 is pressed against friction element 10 as a function of pump pressure. In doing so, the pressure increase speed may be adjusted via the variable speed control of electric motor 13 as a function of the brake request signal pattern. The pressure exerted in cylinder chamber 8 is detected by pressure sensor 23 and its signal is processed in control device 28. When reaching the pressure in cylinder chamber 8 that is a function of the brake request signal, directional control valve 20 is brought into an intermediate setting, so that the pressurized media delivered by pump 14 is diverted through return line 19 to intake-side 15 of the pump, while maintaining the brake pressure. In order to reduce, and possibly entirely dissipate the pressure in cylinder chamber 8, the intermediate setting of directional control valve 20 is changed, or it is switched to its flow-through setting. Due to the elasticity of wheel brake 2, piston 6 is reset, and the pressurized media diverted from cylinder chamber 8 facing away from the brake lining is returned to cylinder chamber 7 facing the brake lining.

During the entire braking period, electric motor 13 is switched on and pump 14 constantly supplies pressurized media. Depending on the pressurized-media demand in cylinder chamber 8 of cylinder-piston unit 3 facing away from the brake lining, the pressurized media return-flow to the pump through return line 19 is adjusted by directional control valve 20. In this context, the gradient of the pressure build-up and pressure reduction in cylinder chamber 8 may be controlled by directional control valve 20 in cooperation with pump 14. Furthermore, actuating unit 1 allows control of the brake pressure for the purpose of controlling slippage when starting from rest and during braking, or for controlling directional stability and for braking independently of the driver.

Pressurized media make-up tank 21 is not really required for the operation of actuating unit 1, since the described hydraulic system is a closed system, and pressurized media is merely exchanged between the two cylinder chambers 7 and 8 upon braking. In practice, make-up tank 21 may be used to replace pressurized media lost at sealing points of cylinder-piston unit 3 or pump 14, or for compensating for heat-related volume fluctuations of the pressurized media in the system.

Actuating unit 1 is a system autonomous for each vehicle wheel. In an advantageous manner, each actuating unit of the vehicle is connected to a separate power supply, or groups of actuating units are connected to separate power supplies. In case of malfunction of one energy supply, the remaining actuating units remain operable.

What is claimed is:

1. An actuating unit for a wheel brake of a motor vehicle, comprising:

an electric motor;

a hydraulic pump drivable with variable speed by the electric motor;

an element located between a delivery side and an intake side of the hydraulic pump and for adjusting a pressurized-media return flow;

a cylinder-piston unit connected to the hydraulic pump on the delivery side, by which at least one brake lining is able to be pressed against a friction element connected to one vehicle wheel and lifted off therefrom; and a control device by which an electric brake request signal is able to be processed and by which the electric motor and the element for adjusting the pressurized-media return flow are controllable, wherein:

the cylinder-piston unit includes a piston having identical surfaces on both sides and a cylinder having cylinder chambers arranged on both sides of the piston, and the intake side of the hydraulic pump is connected to the cylinder chamber on a brake-lining side.

2. The actuating unit according to claim 1, wherein:

the hydraulic pump is constantly driven when the wheel brake is actuated, and the element for adjusting the pressurized-media return flow is a 2/2 directional control valve having a number of intermediate settings.

3. The actuating unit according to claim 2, further comprising:

a measuring transducer for measuring a pressure and connected on the delivery side of the hydraulic pump, wherein:

a signal produced by the measuring transducer is able to be processed in the control device.

4. The actuating unit according to claim 1, further comprising:

a pressurized-media make-up tank to which the intake side of the hydraulic pump is connected.

* * * * *